United States Patent
Uber (10) Patent No.: US 8,242,466 B2
(45) Date of Patent: Aug. 14, 2012

(54) ACTIVATION DEVICE FOR ACTIVATABLE INDICATORS USED IN PRODUCT LABELING

(75) Inventor: Markus Uber, Pfullingen (DE)

(73) Assignee: Bizerba GmbH & Co. KG, Balingen (DE)

( * ) Notice: Subject to any disclaimer, the term of this patent is extended or adjusted under 35 U.S.C. 154(b) by 668 days.

(21) Appl. No.: 12/083,801

(22) PCT Filed: Oct. 20, 2006

(86) PCT No.: PCT/EP2006/010164
§ 371 (c)(1),
(2), (4) Date: Feb. 9, 2009

(87) PCT Pub. No.: WO2007/045506
PCT Pub. Date: Apr. 26, 2007

(65) Prior Publication Data
US 2009/0212227 A1    Aug. 27, 2009

(30) Foreign Application Priority Data
Oct. 21, 2005    (DE) .......................... 10 2005 051 470

(51) Int. Cl.
*G21K 5/00* (2006.01)
(52) U.S. Cl. .......................... 250/492.1; 53/52; 250/372
(58) Field of Classification Search .................. 250/372, 250/492.1; 53/52
See application file for complete search history.

(56) References Cited

U.S. PATENT DOCUMENTS

| | | | |
|---|---|---|---|
| 4,785,295 A | 11/1988 | Fukui et al. | |
| 4,862,194 A | 8/1989 | Uematsu | |
| 4,892,677 A | 1/1990 | Preziosi et al. | |
| 5,207,855 A | 5/1993 | Nyfeler et al. | |
| 7,081,364 B1 | 7/2006 | Haarer et al. | |
| 2002/0168212 A1 | 11/2002 | Nedblake, Jr. et al. | |
| 2006/0071796 A1* | 4/2006 | Korzeniewski | 340/572.8 |
| 2007/0275467 A1 | 11/2007 | Louvet et al. | |

FOREIGN PATENT DOCUMENTS

| | | |
|---|---|---|
| DE | 19803208 C2 | 8/1999 |
| DE | 20203462 U1 | 8/2003 |
| EP | 0117390 B1 | 9/1990 |
| EP | 0433575 A1 | 6/1991 |
| JP | 04-091794 A | 8/1992 |
| JP | 07-078751 A | 3/1995 |
| WO | WO 2005/026383 A1 | 3/2005 |
| WO | WO 2005/005192 A1 | 6/2005 |
| WO | WO 2005/050192 A1 | 6/2005 |
| WO | WO 2005/075978 A2 | 8/2005 |

OTHER PUBLICATIONS

Japanese Office Action of Nov. 22, 2011 and English translation thereof.

\* cited by examiner

*Primary Examiner* — Mark R Gaworecki
(74) *Attorney, Agent, or Firm* — Kilpatrick Townsend & Stockton LLP (57) ABSTRACT

The invention relates to an activation device for temperature-sensitive and/or time-sensitive indicators for product labeling, said indicators being activated by UV light and said device comprising a UV light source. The device is equipped with a controller/regulator, which can be used to control and/or regulate the irradiation period and/or the irradiation intensity of the UV light source.

24 Claims, 4 Drawing Sheets

ACTIVATION DEVICE FOR ACTIVATABLE INDICATORS USED IN PRODUCT LABELING

CROSS-REFERENCE TO RELATED APPLICATIONS

This application is a National Stage of International Application No. PCT/EP2006/010164, filed Oct. 20, 2006, and which claims the benefit of German Patent Application No. 102005051470.7, filed Oct. 21, 2005, the disclosures of both applications being incorporated herein by reference.

BACKGROUND OF THE INVENTION

The invention relates to an activation device for temperature-sensitive and/or time-sensitive indicators activatable by UV light for product labeling, comprising a UV light source device.

The invention further relates to a device for the provision of activated temperature-sensitive and/or time-sensitive indicators for product labeling.

The invention furthermore relates to a method for the activation of a temperature-sensitive and/or time-sensitive indicator activatable by UV light for product labeling.

A substrate is known from DE 198 03 208 C2 for the packaging of or for the application onto aging-sensitive and temperature-sensitive products having a time/temperature indicator arranged in the region of the substrate, with the time/temperature indicator being a time/temperature indicator whose starting time can be set as desired defined by light radiation, with the indicator containing a matrix and at least one reversible, rechargeable crystalline indicator which is embedded therein and which has photochromic properties on the basis of transfer reactions.

After the activation of the time/temperature indicator via light, and in particular UV light, the color of the indicator changes in dependence on the time and on the temperature. A product labeling can thereby be provided, with the color of the indicator corresponding to the freshness and the quality of the product.

SUMMARY OF THE INVENTION

It is an underlying object of the present invention to provide an activation device of the initially named kind with which activated indicators can be provided in a simple manner.

This object is satisfied in accordance with the invention with the activation device of the initially named kind in that a control/regulation device is provided via which the radiation time and/or the radiation strength of the UV light source device can be controlled and/or regulated.

The time dependence and/or temperature dependence of the "deenergizing" after the activation can be set by the control/regulation of the radiation time and/or radiation strength. Time integrator properties or time/temperature integrator properties of the indicator can thereby be set via the activation device. An adaptation to a product to be labeled is thereby possible. For example, products which spoil faster can be provided with correspondingly activated indicators which deenergize "faster".

The aging and/or any contamination of the UV light source device with respect to the UV light radiation can also be taken into account by the control/regulation device. A feedback loop can be realized via which the radiation strength and/or radiation time of the UV light source device can be readjusted such that the aging and/or contamination is compensated.

The object is furthermore satisfied in accordance with the invention in that the UV light source device includes at least one UV light emitting diode. UV light emitting diodes can be controlled in a simple manner and have low space requirements. The activation device can thereby be designed in a space-saving manner. It can thereby be integrated, for example, into a labeling device and in particular a hand-held labeling device. Furthermore, UV light emitting diodes have a relatively low electrical energy consumption. The radiated light can furthermore be focused in a simple manner. Indicators can be activated in a simple manner in a continuous process.

It is generally possible for the control of the radiation time and/or radiation strength to take place via diaphragms which are moved mechanically. It is advantageous for the light generation at the UV light source device to be able to be controlled and/or regulated by the control/regulation device. No mechanical elements then have to be provided. Such a control/regulation of the light generation can be carried out in a simple manner when the UV light source device includes UV light emitting diodes.

It is favorable for the electrical action on the UV light source device to be able to be controlled and/or regulated by the control/regulation device. The electrical action can be varied in a simple manner. When the UV light source device includes UV light emitting diodes, the radiation strength can thereby be set in a simple manner (by the current) and the radiation time can be set in a simple manner (by being acted on or by not being acted on).

The radiation time can in be particular be adjusted between 0.05 s and 20 s, and preferably between 0.1 s and 10 s, by the control/regulation device. The indicator properties of an activated indicator can thereby be set directly.

For the same reason, it is favorable if the radiation strength can be adjusted by the control/regulation device between 25 mW/cm$^2$ and 400 mW/cm$^2$ and in particular between 50 mW/cm$^2$ and 200 mW/cm$^2$.

Provision can be made for the UV light source device to radiate UV light in the wavelength range between 300 nm and 430 nm and in particular in the wavelength range between 350 nm and 380 nm. Known indicator materials can thereby be activated in a reliable manner.

It is favorable for a plurality of UV light emitting diodes to be arranged in one or more rows. A large areal region can thereby be illuminated with the UV light emitting diodes. An indicator can thereby in turn be activated reliably over its total surface and/or a plurality of indicators can be activated simultaneously.

It is favorable when at least one photo sensor is provided. This photo sensor can determine the radiation strength or radiation time of the UV light source device. It is thereby made possible to calibrate the UV light source device, for example. An exact control/regulation of the radiation strength/radiation time is thereby in turn also achievable over a long period.

The at least one photo sensor is in particular arranged facing the UV light source device and/or a reference light source device to enable an effective detection of radiated light. A reference light source device can be provided which, for example, has the same light emitting diode type as the UV light source device; in a parallel aging process and/or with equal contamination of the light emitting diodes, the UV light source device can be calibrated with reference to the measurement results for the reference light source device.

It is favorable when the UV light source device and the at least one photo sensor are arranged such that indicators to be activated can be passed between them. The at least one photo sensor can be arranged such that it is itself not shaded by indicators or by a carrier of indicators. It can also be arranged such that it only becomes effective (i.e. is radiated) when no indicators (which are in particular arranged at labels) are passed through. A calibration procedure and/or checking procedure of the UV light source device can then be carried out, for example, before insertion of a new label tape.

It is preferred for the UV light source device and/or a reference light source device to have memory means for the storage of the operating time of the UV light source device and/or of the reference light source device, in particular for the storage of the operating hour count. The memory means can, for example, be non-volatile memory means, in particular a memory module arranged on a board, preferably an EEPROM. An advanced aging of the UV light source device and/or of the reference light source device can thereby be recognized on which a readjustment is no longer sensible. The memory means and the UV light source device and/or the reference light source device are preferably arranged on a common board so that, on a defect in the UV light source device and/or in the reference light source device or on the reaching of a specific and/or maximum desired operating time, the memory means and the UV light source device and/or the reference light device can be replaced together. It is particularly preferred for the control/regulation device to be arranged on a board and for the UV light source device and/or a reference light source device to be arranged on a further board separate therefrom.

It is favorable for at least one checking sensor to be provided for the testing of the activation of indicators. A check can thereby be made whether an indicator was actually activated or was activated "properly" after passing through the activation device. The calibration and the function of the UV light source device can in turn thereby be checked. A feedback loop for the control/regulation of the UV light source device can be realized based on the measurement results of the checking sensor.

The at least one checking sensor is in particular arranged after the UV light source device to enable an effective check.

If the indicator has photochromic properties, the at least one checking sensor is preferably a color sensor. A check can be made via a color sensor whether an indicator has reached the desired color after the activation. The conditions of specific color valencies (for example RGB values) and the color density can in particular be measured by a color sensor.

It is favorable for an indicator to adopt a specific color by activation, with the color varying in dependence on the time and/or the temperature after the activation. Corresponding indicator materials are described in DE 198 03 208 C2, to which reference is expressly made. The activation result can then be checked in a simple manner by a color sensor.

It is furthermore an underlying object of the invention to provide a device for the provision of activated temperature-sensitive and/or time-sensitive indicators for product labeling which has a simple structure.

This object is satisfied in accordance with the invention in that an activation device in accordance with the invention is provided.

The activation device is in particular an application device for a UV protection filter. As a rule, indicator materials are reversible with respect to the UV light activation. The total system is made irreversible by the application of a UV protection filter onto an activated indicator since a subsequent UV light activation is no longer possible. The corresponding indicator thereby becomes secure against manipulation; that is, the time integrator properties or temperature integrator properties or time/temperature integrator properties can no longer subsequently be influenced by UV light radiation.

It is favorable when a receiver is provided for a stock of activatable indicators. It is thereby made possible to activate a large number of indicators in a short time period to provide indicators for product labeling, which are activated, in a simple and fast manner. The indicators can be activated in a continuous process.

The receiver is in particular designed to hold a roll. The roll is in particular a label roll. It includes, for example, a carrier tape on which labels with indicators are arranged or the roll itself is formed by a label tape, with indicators being arranged on the label tape. The labels can be self-adhesive.

The indicators are in particular arranged at labels. Self-adhesive or non-self-adhesive labels can thereby be provided by means of which products can be labeled.

It is favorable in this process for the labels to be able to be printed and in particular to be able to be printed outside an indicator. Additional data such as product data can thereby also be printed on the labels. The labels can, for example, be printed via thermal printing; they can be printable via thermal transfer or via direct thermal printing. Other printing methods such as ink jet printing are also possible, for example.

The labels are in particular formed at a label tape or on a carrier tape. The labels are, for example, arranged at a label tape without carrier (linerless tape). For this purpose, the labels must be provided with a corresponding non-stick coating if they have an adhesive side. A UV protection filter must be able to stick to the non-stick coating. It is also possible to arrange adhesive labels on a carrier tape (liner).

It is favorable if a dispensing device is provided for the dispensing of labels. Labels which are provided with an activated indicator can thereby be removed from the device or be provided by it in a simple manner. An applicator device for the application of labels to a product/product packaging can be arranged downstream of the dispensing device. The labels can then be attached, in particular automatically, to products/product packaging, for example, which are moved past on a conveyor belt.

It is furthermore an object of the invention to provide a method of the initially named kind which permits variability with respect to the use of the product labeling.

This object is satisfied in accordance with the invention in that the indicator is radiated with UV light and in that the radiation time and/or radiation strength is controlled and/or regulated for the setting of the temperature sensitivity and/or time sensitivity of the indicator.

An operator can then set the time integrator properties or temperature integrator properties or time/temperature integrator properties of indicators, adapted to the product to be labeled, via influencing a control/regulation device. An indicator material can then be activated variably at least within specific limits.

It is favorable when the indicator is illuminated via at least one UV light emitting diode. The method can thereby be carried out in a simple manner.

The electrical action on the at least one light emitting diode is in particular controlled and/or regulated for the control/regulation of the radiation time and/or radiation strength. The light generation at the light emitting diode can thereby be set in a simple manner.

It is furthermore favorable for the emission of the UV light source to be measured by at least one photo sensor. The system can thereby be calibrated in order thus in turn to be able to carry out a precisely adjusted activation of an indicator.

It is furthermore favorable for an activation of the indicator to be checked by a checking sensor. In particular a color of the indicator is checked after the activation. A readjustment of a light source for the UV radiation can also be carried out, i.e. a calibration can be carried out, via the detection result of the checking sensor.

The following description of preferred embodiments serves for the more detailed explanation of the invention in conjunction with the drawing.

DESCRIPTION OF THE PREFERRED EMBODIMENTS

Figure 1:
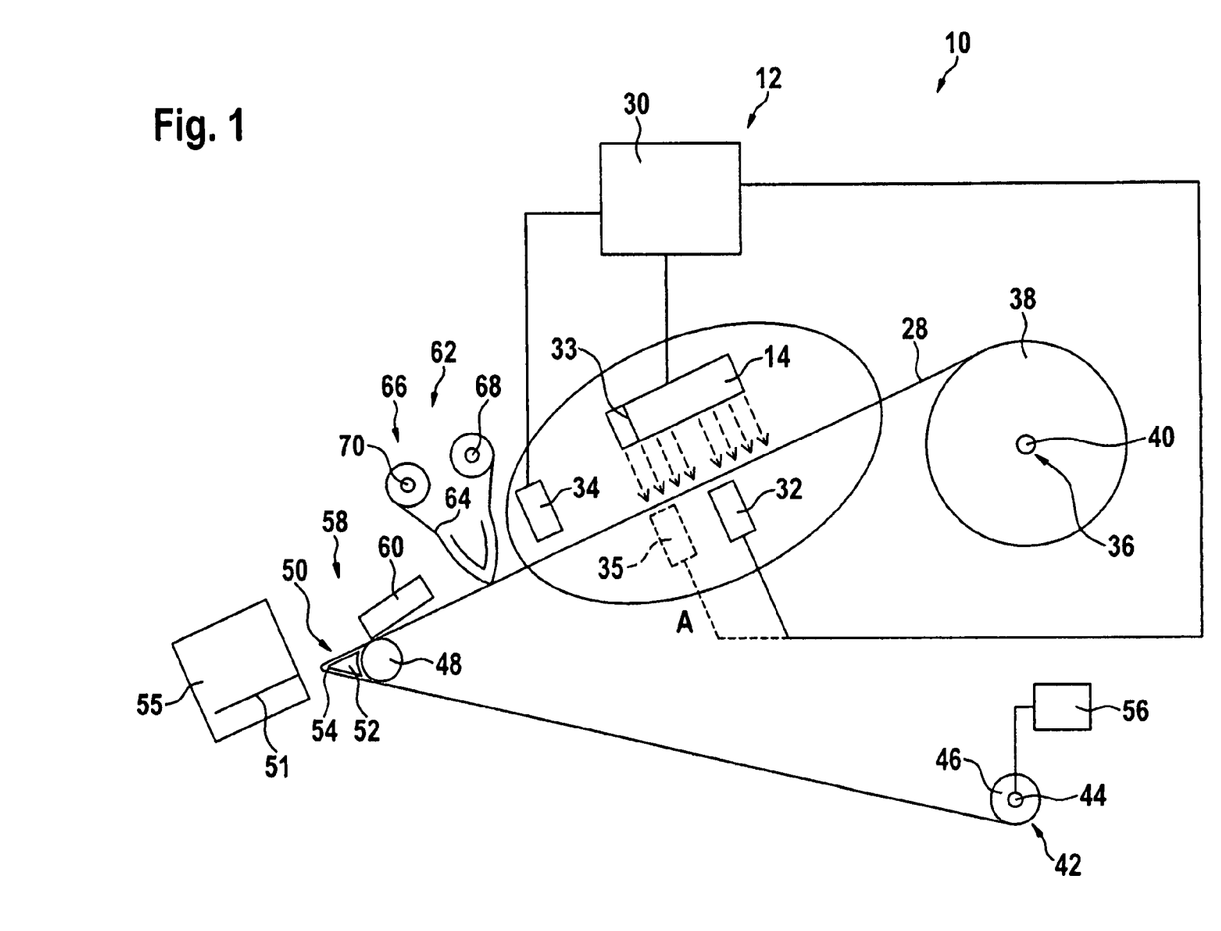
FIG. 1 is a schematic representation of a first embodiment of a device for the provision of activated indicators for product labeling.
Figure 3:
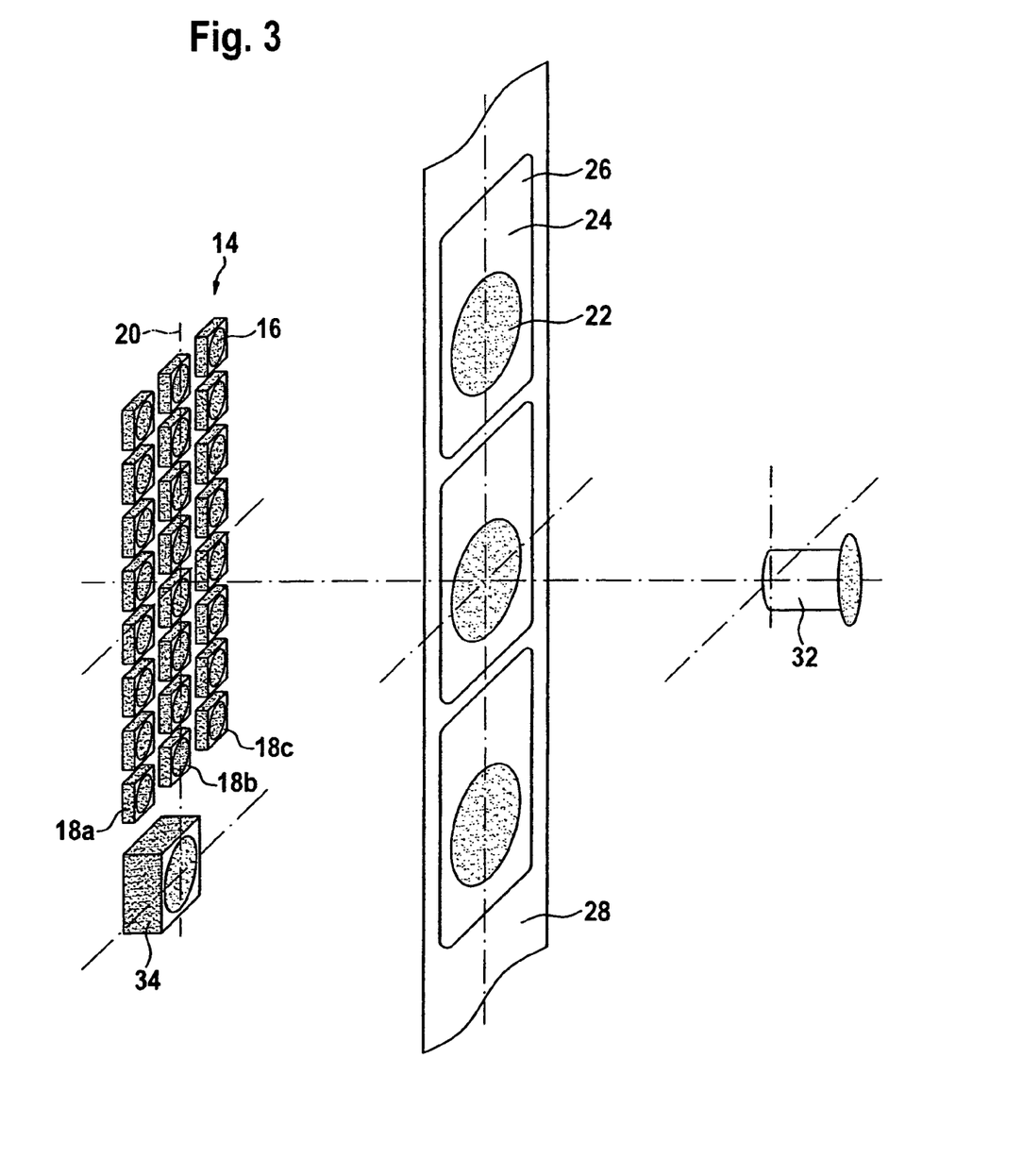
FIG. 3 is an enlarged schematic perspective view taken from region A of FIGS. 1 and 2.

A first embodiment of a device for the provision of activated temperature-sensitive and/or time-sensitive indicators for product labeling, which is shown in FIG. 1 and is designated there by 10, comprises an activation device 12 for the activation of indicators. The activation device 12 has a UV light source device 14 by which indicators to be activated can be illuminated by UV light. The UV light source device 14 is formed by means of UV light emitting diodes 16 (FIG. 3). The light emitting diodes 16 are arranged in one or more rows 18a, 18b, 18c. The UV light emitting diodes 16 are preferably arranged on a straight line 20 within a row. Different rows 18a, 18b, 18c are preferably aligned parallel to one another.

The UV light source device 14 is arranged such that a specific areal region can be illuminated by the UV light source device 14. Indicators 22 can be guided through this areal region. The indicators 22 are in particular arranged at a carrier 24, with the carrier 24 preferably being a (printable) label 26. A label 26 can already be printed with one or more comparison fields for an indicator 22; a comparison field is, for example, designed as a comparison color field. It is possible in this connection for the labels 26 to be separate or to form a contiguous label tape. It is furthermore possible for the carriers 24 for the indicators 22 again to be arranged on a carrier tape 28 themselves. The labels 26 are, for example, self-adhesive and the carrier tape 28 forms a liner.

It is generally also possible for the labels 26 to be made free of carrier tape as linerless labels.

The activation device 12 comprises a control/regulation apparatus 30 by which the light emission of the UV light source device 14 can be controlled and/or regulated with respect to radiation time and radiation strength (intensity). The control/regulation device 30 in particular controls and/or regulates the light generation at the UV light emitting diodes 16 themselves. For this purpose, the current acting on the UV light source device 14 is controlled or regulated to be able to set the intensity of radiation and the radiation time.

Provision is made in this connection for the radiation time to be adjustable at least for a period between 0.05 s and 20 s, and preferably between 0.1 s and 10 s, and for the intensity of radiation furthermore to be adjustable at least in a range between 25 mW/cm$^2$ and 400 mW/cm$^2$, and preferably between 50 mW/cm$^2$ up to 200 mW/cm$^2$.

The wavelength of the light which is emitted by the UV light emitting diodes 16 preferably lies between 350 nm and 380 nm.

At least one UV light sensitive photo sensor 32 is associated with the UV light source device 14. This at least one photo sensor 32 is arranged opposite the UV light source device 14, with the indicators 22 being able to be guided through between the UV light source device 14 and the photo sensor 32. The radiation intensity/radiation time of the UV light source device 14 can be checked by the photo sensor 32. A calibration of the activation apparatus 12 can thereby be carried out, for example, before the insertion of a new label tape. A check can also be made by the photo sensor 32 (for example before insertion of a new label tape) whether light is being emitted at all from the UV light source device 14. A problem with the UV light source device 14 can thereby be recognized.

A reference light source device 33 can also be provided which is preferably controlled in the same manner as the UV light source device 14. The reference light source device 14 in particular has one or more UV light emitting diodes of the same construction as the light source device 14. A photo sensor 35 is associated with the reference light source device 35 and is radiated by it. The photo sensor 35 and the reference light source device 33 are arranged such that the beam acting on the photo sensor 35 is not shadowed by labels being led through. For this purpose, at least the photo sensor 35 or at least the reference light source device 33 is arranged to the side of the carrier tape 28 so that UV radiation emitted by the reference light source device 33 in the direction of the photo sensor 35 is not blocked by the carrier tape 28. Since the reference light source device 33 substantially has the same properties as the UV light source device 14, the latter can be monitored—indirectly—constantly by the photo sensor 35 and can be readjusted as necessary. Generally, a photo sensor 35 arranged to the side of the carrier tape 28 can, however, also be associated with the UV light source device 14 itself, which must then be designed and arranged such that an at least small portion of the emitted light is not incident onto the carrier tape 28, but onto the photo sensor 35.

The activation device 12 furthermore comprises at least one checking sensor 34 which is arranged, with respect to the carrier or carriers 24 for the indicators 22, on the same side as the UV light source device 14. This checking sensor 34 is in particular a color sensor. A check can be made by it after the UV light source device 14 whether an activation actually took place and in the required degree, that is, whether the desired energy transfer to the indicators 22 has actually taken place. Defective and/or incorrectly exposed indicators 22 can hereby be recognized and eliminated. An automatically working or manually operable external checking sensor can also be provided, instead of or in addition to the checking sensor 34 disposed downstream of the UV light source device 14, to check the correct activation at least randomly. It is generally also possible for a checking sensor to be integrated into a printing device explained in more detail in the following.

For example, a control loop can be realized with the help of the photo sensor 32 and/or 35 and the control/regulation device 30, and the aging and/or a contamination of the light sources of the UV light source device 14 (that is, the UV light emitting diodes 16) is automatically eliminated by it in that the intensity of radiation and/or the radiation time is readjusted automatically in accordance with the aging and/or the contamination.

It is generally also possible for no photo sensor 32 or 35 and only one checking sensor 34 to be provided which, together with the control/regulation device 30, forms a control loop via which the aging and/or a contamination of the light sources of the UV light source device 14 is automatically eliminated.

The photo sensor 32 (and optionally the photo sensor 35) and the checking sensor 34 transfer their sensor signals to the control/regulation device 30 via corresponding lines. This transmits its control signals or regulation signals to the UV light source device 14 via a corresponding line.

The device 10 comprises a receiver 36 to hold a roll 38. The roll 38 is, for example, a carrier tape roll with a carrier tape 28 which can be unwound and on which the indicators 22 are arranged at corresponding carriers 24 (for example labels 26). The carrier tape 28 is guided between the UV light source device 14 and the photo sensor 32 and is guided past the checking sensor 34.

The receiver 36 comprises a holding mandrel 40 for the roll 38, for example.

Generally, different types of indicators can be provided which in particular differ with respect to their color and/or the radiation energy required for the activation. Different types of indicators can, for example, be used for different types of meat. Indicators of one kind can in each case be wound up on a roll 38, with different kinds of rolls differing by the type of their indicators. It can then be ensured by means of the photo sensor 32 or 35 or of the photo sensors 32, 35 that the energy transfer desired for the respective indicator type takes place. It is made possible by the combination of one or two photo sensors 32, 35 and a checking sensor 34 to determine whether a "correct" roll was inserted for the product to be labeled in each case with the corresponding indicators 22. It can initially be ensured in this connection by means of the photo sensor or photo sensors 32, 35 that the energy transfer desired for the respective indicator type takes place. After the activation, a coloration and/or intensity value of the indicators 22 can be determined by means of the checking sensor 34, for example. If the value found differs from the expected value for the respective indicator type, it can be concluded, in particular if other error sources are eliminated, that an "incorrect" roll had been inserted.

A holding device 42 can be provided which in particular comprises a holding mandrel 44 by which a roll 46 with a wound-on carrier band is held.

The device 10 comprises a guide element 48 via which the carrier tape 28 is guided to the holding device 42. A dispenser device 50 for labels is formed at or in the proximity of the guide element 48. Labels 51 can be peeled off the carrier tape 28 at the dispenser device 50 and can be removed from the device 10. (The device 10 is then a labeling device.) The dispenser device 50, for example, comprises a wedge-shaped element 52 with a dispensing edge 54.

The roll 46 is formed by a label-free carrier tape, that is, a carrier tape, which is label-free due to peeling off of labels 51 at the dispenser device 50.

An applicator device 55 can be arranged after the dispensing device 50 and labels 51 can be applied to products or product packaging via it. An automatic label application can thereby be realized. Labels (with activated indicators 22) are, for example, automatically applied to products/product packaging which are guided on a conveyor belt.

The applicator device 55 is made, for example, as a blow applicator, plunger applicator or pressing applicator.

Provision can be made for the holding device 42 to be driven by a drive 56 to wind up the carrier tape accordingly.

It is also possible for the labels themselves to form a tape so that no carrier tape is provided (linerless labels). The guidance of the corresponding label tape in the device 10 is then made such that elements of the guide, which come into contact with an adhesive side of the label tape if the labels are self-adhesive, are provided with an anti-stick coating.

The device 10 comprises at least one printing device 58. The printing device 58 itself has a print head 60 and a mating element and in particular a print roll. The guide element 48 is in particular made as a print roll.

The device 10 moreover has an application device 62 by which a UV protective filter can be applied to an indicator 22 after its activation. A protection of an indicator against manipulation is achieved by the UV protective filter; an indicator 22 cannot be activated again after application of the protective filter so that the device 10 provides irreversibly activated indicators 22.

A UV protective filter can be applied to an indicator 22 via a tape 64 via the application device 62, with the tape having corresponding UV protective filter properties. The application device 62 comprises for this purpose a tape guiding device 66 via which the tape 64 can be guided such that UV protective filters can be applied to the activated indicators 22.

The tape 64 comprises, for example, a UV protective filter and is made transparent; it can also be self-adhesive. It is applied to respective applicators 22 in part elements (as labels) or continuously.

The tape guiding device 66, for example, comprises a first roll holder 68 and a second roll holder 70. A tape roll can be placed onto the first roll holder 68 and the tape can be unwound from there. A roll can be wound up via the second roll holder 70. The second roll holder 70 is driven, for example.

The device 10 can be made in compact form. It is made as a hand-held device, for example. It can also be integrated into a labeler with an applicator device 55. Labels can then be provided having activating indicators 22 and can be applied automatically to products/product packaging.

Figure 2:
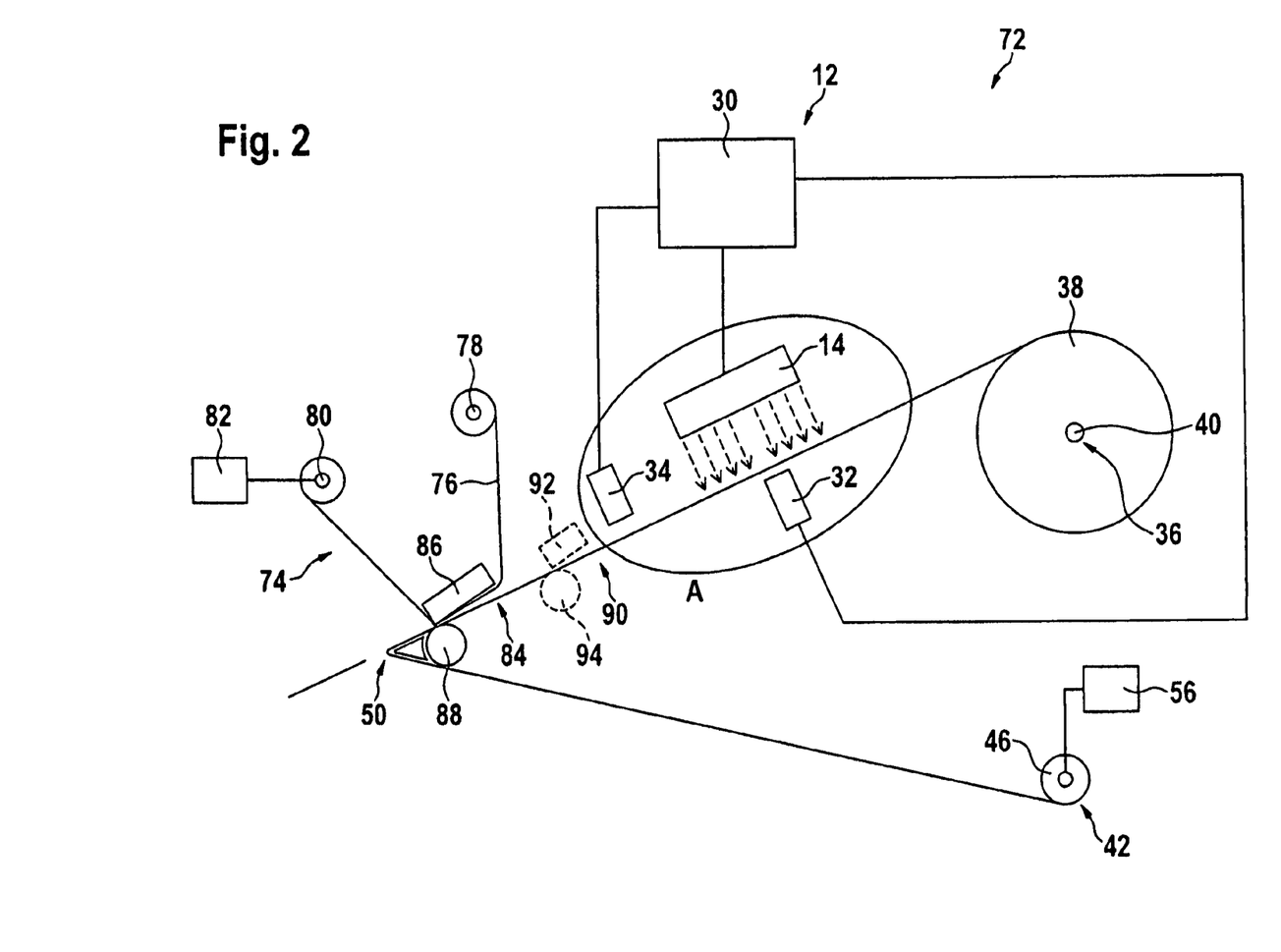
FIG. 2 is a schematic representation of a second embodiment of a device for the provision of indicators for product labeling.

In a second embodiment of a device in accordance with the invention, which is shown in FIG. 2 and is designated by 72 there, an activation device 12 is provided which is generally configured the same as the activation device 12 of the device 10. The same reference numerals are therefore used for this activation apparatus of the device 72.

The receiver for a roll 38 is likewise made the same so that the same reference numerals are used. The dispenser device is also generally made the same as described above.

The device 72 comprises a tape guiding device 74 for a transfer tape 76. The transfer tape 76 is a thermal transfer tape, for example.

The tape guiding device 74 has a first roll holder 78 and a second roll holder 80 between which the transfer tape 76 is guided. The transfer tape 76 is in particular unwound from a roll which is seated at the first roll holder 78 and can be wound up at a roll which is seated on the second roll holder 80. The second roll holder 80 is driven by a drive 82, for example.

The device 72 comprises a printing device 84 having a print head 86 and a print roll as a mating element 88. Labels 26 at a label tape or on a carrier tape 28 are guided between the print head 86 and the mating element 88.

The tape guiding device 74 is made such that the transfer tape 76 is led past the print head 86. The transfer tape 76 comprises a UV protective filter material. It can then be applied to corresponding activated indicators 22 by the print head 86.

The print head 86 can be controlled such that UV protective filter material can be applied directly onto the indicator 22 in accordance with its geometrical dimensions.

It is generally possible in this connection (if the transfer tape 76 is suitable for it) also to print corresponding labels 26 with information such as product information outside the indicator 22 by the printing device 84.

It is also possible for a second printing device 90 to be provided in addition to the printing device 84 (first printing device) which can be arranged between the printing device 84 and the activation device 12 or can be arranged downstream of the printing device 84. The second printing device 90 in particular comprises a print head 92 and a mating element 94. Information can be printed on labels 26 by the second printing device 90 independently of the printing device 84.

Provision can also be made for the device 72 to provide labels having indicators 22 which are activated, provided with UV protective filters and are coupled into a labeling apparatus with a printing device in order to print the labels outside the indicators 22 with information such as product data. It is favorable in this case for the apparatus 72 not to provide individual labels, but a tape such as a label tape or a carrier tape 28 with non-peeled labels.

The apparatus 10 and 72 work as follows:

An indicator 22 is made from a material which can be activated by UV light and is temperature-sensitive and time-sensitive; that is, after the material has been stimulated, the deenergizing depends on the time after the stimulation and on the temperature. The indicator 22 is in particular a time/temperature indicator having an integration effect with respect to time and temperature. The starting time is determined by the activation time.

Examples for indicator materials are rechargeable, crystalline indicators embedded into a matrix and having photochromic properties based on transfer reactions. Such materials are described, for example, in DE 198 03 208 C2, to which reference is expressly made.

An indicator can, for example, have different colors depending on the time and on the temperature. Provision can be made for at least one fixed comparison color field to be arranged at an indicator 96 (FIG. 4) so that the status can immediately be recognized with the eyes. For example, a first dark color field 98 is provided which indicates the color directly after the activation. A second color field 100 can be provided which indicates the color after a medium time period—under the same temperature conditions. A third color field 102 can be provided which indicates the color after a longer time period—under the same temperature conditions. The colors of the color fields 98, 100 and 102 are fixed. The color of the first color field, for example, symbolizes a "fresh" state; the color of the second color field 100 a "medium" state; and the color of the third color field 102 symbolizes a "no longer fresh" state, for example.

Figure 4:
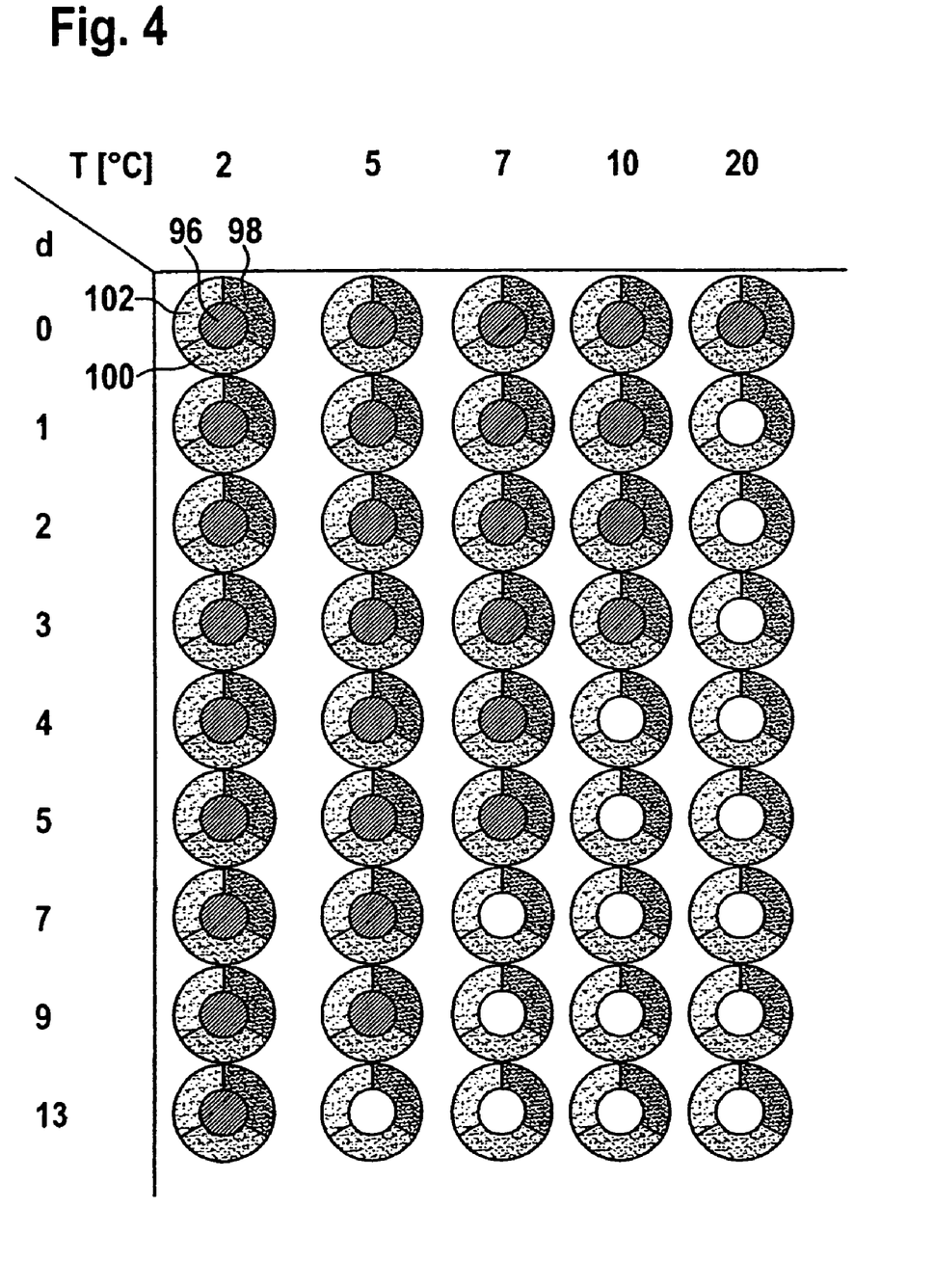
FIG. 4 is a schematic representation of embodiments of an indicator, illustrating its time dependence and temperature dependence after the activation.

If only one comparison color field is provided, it symbolizes a state "to be used", for example.

The color-changing indicator 96 is, for example, circular with the color fields 98, 100 and 102 surrounding the indicator in the manner of a ring segment.

The color of the indicator 96 changes in accordance with the activation time/temperature integral, as indicated in FIG. 4. At higher temperatures, the color of the indicator 96 changes faster than at lower temperatures with time.

Such an activated indicator 96 can be used for product labeling. After application of a corresponding product labeling with an indicator 96, this indicator 96 runs through the same time development and temperature development as the product labeled by the indicator 96; that is, it is subject to the same time conditions and temperature conditions. The state of the product and in particular the degree of freshness of the product can thereby be visualized by the temperature-sensitive and time-sensitive indicator 96. Foodstuffs can thereby, for example, be labeled with respect to their degree of freshness.

The start time is set by the time of activation. The indicators 96 are supplied to the activation apparatus 12 for this purpose, where an activation by UV light takes place. Due to the activation by UV light, transfer reactions are, for example, photochemically induced in the indicator material, with fading times of different lengths being able to be achieved in dependence on the bonding strength of an acceptor of the transferred species in the acceptor material (cf. DE 198 03 208 C2).

The intensity of radiation and/or the radiation time of the radiation with UV light of corresponding indicators 22, 96 can be set by the control/regulation device 30. The time sensitivity and/or temperature sensitivity of an activated indicator 22 can thereby be set in at least a certain range. For example, with an increased intensity of radiation, a longer fading time can be achieved (with respect to the same temperature conditions). An operator can therefore set the desired properties via the control/regulation device 30.

A calibration of the UV light source device 14 can be carried out via the photo sensor 32 and a monitoring can be made of whether a defect is present with respect to the lighting.

A check can be made via the checking sensor 34, which is in particular a color sensor, of whether an indicator 22 has reached the desired color by the activation.

A UV protective filter is applied to an activated indicator 22 by the application device 62 or the printing device 84 (which serves as an application device). The indicator 22 is thereby made safe against manipulation since a repeated activation by UV light is no longer possible; that is, the activation is made irreversible by the UV protective filter. A repeated UV light activation would only be possible by removal of the UV protective filter (which results in a destruction of the indicator 22).

Provision can also be made for a UV protective filter to be applied to the comparison color field or fields. The color comparability can in particular thereby be optimized when a UV protective filter is not completely transparent for light in the visible spectrum.

The UV protective filter is applied to the indicators 22 via a tape, with the tape being able to be applied directly or (as described with reference to the apparatus 72) with a transfer of UV protective filter material taking place from the transfer tape 76 to an activated indicator 22. The transfer tape 76 is in particular a thermal transfer tape, such as a carbon tape, on which corresponding UV protective filter material is arranged.

It is transferred onto the indicator 22 via the printing device 84 having the print head 86. The print head 86 can be controlled such that UV protective filter material is "printed" onto the indicator 22 in accordance with the geometrical dimensions thereof.

The present components of a labeling apparatus having a thermal transfer printing apparatus can thereby be used to arrange a UV protective filter on indicators 22.

The indicators 22 are arranged on carriers 24 such as labels 26. The labels 26 are in turn arranged on a carrier tape 28 or are themselves formed on a label tape. The indicators 22 are guided past the UV light source device 14 for activation. The UV protective filter material is applied after activation.

Provision can be made for the corresponding labels 26 to be printed with information such as product data outside the indicators 22. This printing can take place by the apparatus 72 itself (by the second printing device 90 there) or outside the apparatus 72.

It is generally also possible, if a suitable transfer tape 76 is present, for a printing of the labels 26 to take place outside the indicators 22 by the printing device 84.

It is also possible for labels 26 provided by the device 72 and provided with activated indicators 22 to be supplied to a labeling device in which they are printed.

The invention claimed is:

1. An activation device for temperature sensitive and/or time sensitive indicators activatable by UV light for product labeling, comprising:
   a UV light source device;
   a regulation device via which radiation time and/or radiation strength of the UV light source device can be regulated; and
   at least one photo sensor;
   wherein the UV light source device and the at least one photo sensor are arranged such that indicators to be activated can be passed between them.

2. An activation device in accordance with claim 1, wherein light generation at the UV light source device can be regulated by the regulation device.

3. An activation device in accordance with claim 1, wherein electrical action on the UV light source device can be regulated by the regulation device.

4. An activation device in accordance with claim 1, wherein the radiation time can be adjusted between 0.05 s and 20 s by the regulation device.

5. An activation device in accordance with claim 1, wherein the radiation strength can be adjusted between 25 mW/cm$^2$ and 400 mW/cm$^2$ by the regulation device.

6. An activation device in accordance with claim 1, wherein the UV light source device radiates UV light in a wavelength range between 300 nm and 430 nm.

7. An activation device in accordance with claim 1, wherein the UV light source comprises a plurality of UV light emitting diodes arranged in one or more rows.

8. An activation device in accordance with claim 1, wherein the at least one photo sensor is arranged facing the UV light source device and/or a reference light source device.

9. An activation device in accordance with claim 1, further comprising at least one checking sensor for checking of the activation of the indicators.

10. An activation device in accordance with claim 9, wherein the at least one checking sensor is a color sensor.

11. An activation device in accordance with claim 1, wherein the UV light source device comprises at least one UV light emitting diode.

12. An activation device for temperature sensitive and/or time sensitive indicators activatable by UV light for product labeling, comprising:
    a UV light source device;
    a regulation device via which radiation time and/or radiation strength of the UV light source device can be regulated; and
    at least one photo sensor;
    wherein the at least one photo sensor and/or a reference light source device is arranged such that the at least one photo sensor can also be acted on by radiation when indicators are led past the UV light source device.

13. An activation device for temperature sensitive and/or time sensitive indicators activatable by UV light for product labeling, comprising:
    a UV light source device;
    a regulation device via which radiation time and/or radiation strength of the UV light source device can be regulated; and
    at least one checking sensor for checking of the correct activation of indicators arranged after the UV light source device.

14. A device for provision of activated temperature sensitive and/or time sensitive indicators for product labeling, comprising:
    an activation device for temperature sensitive and/or time sensitive indicators activatable by UV light for product labeling, comprising:
       a UV light source device, and
       a regulation device via which radiation time and/or radiation strength of the UV light source device can be regulated; and
    an application device for a UV protection filter arranged after the activation device.

15. A device in accordance with claim 14, further comprising a receiver for a store of activatable indicators.

16. A device in accordance with claim 15, wherein the receiver is configured for the holding of a roll.

17. A device in accordance with claim 14, further comprising a dispensing device for the dispensing of labels.

18. A device in accordance with claim 14, further comprising an applicator device for the application of labels to products or product packaging.

19. A method for activation of a temperature sensitive and/or time sensitive indicator activatable by UV light for product labeling, wherein the indicator is radiated with UV light of a UV light source device, wherein radiation time and/or radiation strength is regulated for adjustment of temperature sensitivity and/or of time sensitivity of the indicator, such that aging and/or contamination of the UV light source device is compensated.

20. A method in accordance with claim 19, wherein the indicator is illuminated via at least one UV light emitting diode.

21. A method in accordance with claim 19, wherein electrical action on the UV light source device is regulated for the regulation of the radiation time and/or radiation strength.

22. A method in accordance with claim 19, wherein light emission of the UV light source device or of a reference light source device is measured by at least one photo sensor.

23. A method in accordance with claim 19, wherein an activation of the indicator is checked by a checking sensor.

24. A method for activation of a temperature sensitive and/or time sensitive indicator activatable by UV light for product labeling, wherein the indicator is radiated with UV light of a UV light source device, wherein radiation time and/or radiation strength is regulated for adjustment of temperature sensitivity and/or of time sensitivity of the indicator, and wherein correct activation of the indicator is checked after the end of the activation by a checking sensor.

* * * * *